J. J. MOJONNIER.
LABORATORY DISH.
APPLICATION FILED FEB. 1, 1919.
1,336,043. Patented Apr. 6, 1920.
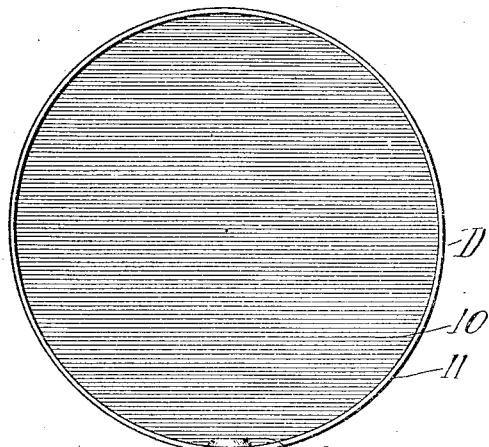
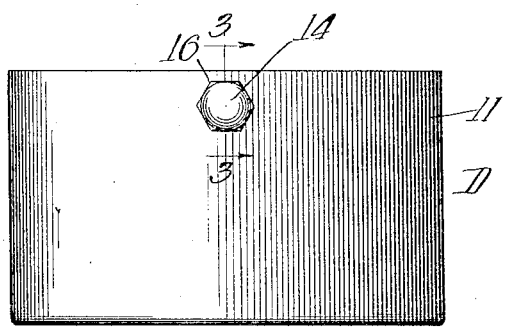
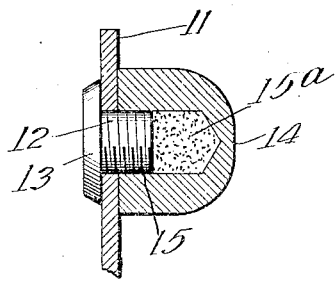
Witnesses
Harry R. L. White
W. P. Kilroy
Inventor
Julius John Mojonnier,
By Charles S. Wilson
Atty.

UNITED STATES PATENT OFFICE.

JULIUS JOHN MOJONNIER, OF OAK PARK, ILLINOIS, ASSIGNOR, BY MESNE ASSIGNMENTS, TO MOJONNIER BROS. CO., OF CHICAGO, ILLINOIS, A CORPORATION OF ILLINOIS.

LABORATORY-DISH.

1,336,043.          Specification of Letters Patent.          Patented Apr. 6, 1920.

Application filed February 1, 1919. Serial No. 274,487.

*To all whom it may concern:*

Be it known that I, JULIUS J. MOJONNIER, a citizen of the United States, and a resident of Oak Park, in the county of Cook and State of Illinois, have invented certain new and useful Improvements in Laboratory-Dishes, of which the following is a specification.

The present invention relates to dishes primarily designed for laboratory use, and has for its object the provision of a dish of this character, the weight of which may be and is absolutely, definitely and accurately determined and fixed, thereby making it possible to so standardize the weights of a number of dishes that there will be no measurable or appreciable variance in the relative weights thereof.

With the above and other objects in view, as will be apparent, this invention consists of the construction, combination and arrangement of parts all as hereinafter more fully described, claimed and illustrated in the accompanying drawing, wherein:—

Figure 1 is a plan view of a dish constructed in accordance with the present invention.

Fig. 2 is an elevation thereof.

Fig. 3 is a vertical section taken along line 3—3 of Fig. 2 to illustrate the details of construction of standardizing attachment.

A dish of the character of the present invention is fundamentally designed for use in laboratories wherein very accurate determinations by weight are accomplished. Hence, to determine the contents of a dish accurately and positively by weight, the weight of the dish empty is deducted from the weight of the dish and its contents. The accuracy of this calculation is very obviously predicated upon knowledge of the exact weight of the dish empty. Heretofore this has been accomplished by providing a counterpoise for each dish which was exactly equal in weight to the weight of the dish, so that by placing the empty dish on one side of a balance and its particular counterpoise upon the other side of the balance, the weight of one would exactly equalize the other. Thus the weight of the contents of any dish was accurately and exactly determined by the weight it was necessary to add to the counterpoise side of the balance to equalize the dish and its contents.

Such a method very naturally employs a counterpoise individual to each dish, because it has been found impossible under even extraordinary manufacturing methods, to produce any quantity of dishes which will be identical as to weight. The present device is designed to so accurately and definitely standardize and equalize the weight of these dishes that a single counterpoise may be used for any one of a quantity of the dishes without in any manner affecting the accuracy of the determinations being carried out therein, as would be the case where the weights of the dishes varied even minutely.

Reference being had more particularly to the drawings, D designates a dish constructed in accordance with the present invention, including the bottom 10 and the wall 11. This dish D is spun from a metal such as aluminum, which is a ready conductor of heat, and is so formed and positioned that it is relatively shallow.

The wall 11 of the dish D is pierced by the threaded stud 12 at a point near the edge thereof, said stud being provided with a flat head 13 adapted to rest flush against and conform to the interior of the wall 11. At its outer or free end the stud 12 projects somewhat beyond the wall 11 of the dish D, where it coöperates with a cap 14. This cap 14 is provided with a coaxial pocket 15 therein, which is interiorly threaded adjacent to the mouth thereof for the engagement of the threads of the stud 12, thus leaving a portion of the pocket 15 free and unoccupied when the stud 12 and cap 14 are interengaged, to create a container 15$^a$ within the cap. The cap 14 is provided with the hexagonally faced portion 16, at the end thereof adjacent to the wall 11, *i. e.*, the end containing the mouth of the pocket 15, for the purpose of providing a grip for assembling or disengaging the elements.

A standard weight is decided upon for the dish which may be selected by striking an average of the weight of a number of dishes. Each dish is then very carefully and accurately weighed with the equalizer, comprising the elements 12 and 14, attached thereto, the container 15$^a$ of the cap 14 being empty. If the dish is found to be above the standard weight previously selected, the cap 14 is ground to remove sufficient metal to bring the weight of the dish D exactly to the standard selected. It will be observed that the wall of the cap 14 is relatively very thick for this purpose. If, on the contrary, the weight of the dish is below the standard selected or too much metal has been removed from the cap 14, the cap is disengaged from the stud 12 and powdered lead placed in the container 15ª thereof in sufficient quantity to bring the weight of such sub-standard dish to exactly the standard weight previously selected.

It becomes at once apparent that any quantity of dishes D may be thus standardized as to weight and a single counterpoise be used with any one of the dishes so standardized. It is also possible to change the weight of a dish whenever it is decided to do so.

The head 13 of the equalizing attachment in coöperation with the faced portion 16 of the cap 14 prevents any possible leakage through the hole in the wall 11 of the dish through which the stud 12 passes.

What is claimed is:—

1. The combination with a dish, of means attached thereto for fixing the weight thereof.

2. The combination with a dish, of a stud piercing the wall thereof, and a cap coöperating with said stud.

3. The combination with a dish, of a stud piercing the wall thereof, and a cap coöperating with said stud, said cap being provided with a container.

4. The combination with a dish, of a headed and threaded stud piercing the wall of said dish, said head being located on the interior of the dish, and a pocketed cap having interior threads in a portion of the pocket thereof for engagement with the threads of the stud.

5. The combination with a dish, of a headed and threaded stud piercing the wall of said dish, said head being located on the interior of the dish, a pocketed cap having interior threads in a portion of the pocket thereof for engagement with the threads of the stud, and a faced portion adjacent the pocketed end of said cap.

6. The combination with a dish, of means capable of having its weight increased or reduced to increase or reduce the weight of the dish.

7. The combination with a dish, of an attachment therefor capable of having its weight increased or reduced to correspondingly increase or reduce the weight of the combination.

8. The combination with a dish, of an attachment therefor, the manipulation of which will vary the weight of the combination.

9. The combination with a dish, of an attachment therefor, the weight of which may be varied.

10. The combination with a dish, of an attachment therefor including means whereby the weight of said attachment may be increased or decreased.

11. The combination with a dish, of an attachment therefor including means whereby the weight of which may be permanently reduced.

12. The combination with a dish, of an attachment therefor including means whereby the weight of which may be permanently reduced, and further means for otherwise varying its weight.

13. The combination with a dish, of a weight regulating attachment therefor.

JULIUS JOHN MOJONNIER.